N. Chapman,
Drop Hammer,

Nº 14,009. Patented Jan. 1, 1856.

UNITED STATES PATENT OFFICE.

NATHAN CHAPMAN, OF MYSTIC RIVER, CONNECTICUT.

CHAIN FOR POWER-PRESSES.

Specification of Letters Patent No. 14,009, dated January 1, 1856.

*To all whom it may concern:*

Be it known that I, NATHAN CHAPMAN, of Mystic River, in the county of New London and State of Connecticut, have invented a new and useful Improvement in the Construction of Chains to be Used in Presses Where a Progressive Power is Required; and I do hereby declare that the following is a full, clear, and exact description of the same, reference being had to the annexed drawings, making a part of this specification, in which—

Figure 1:
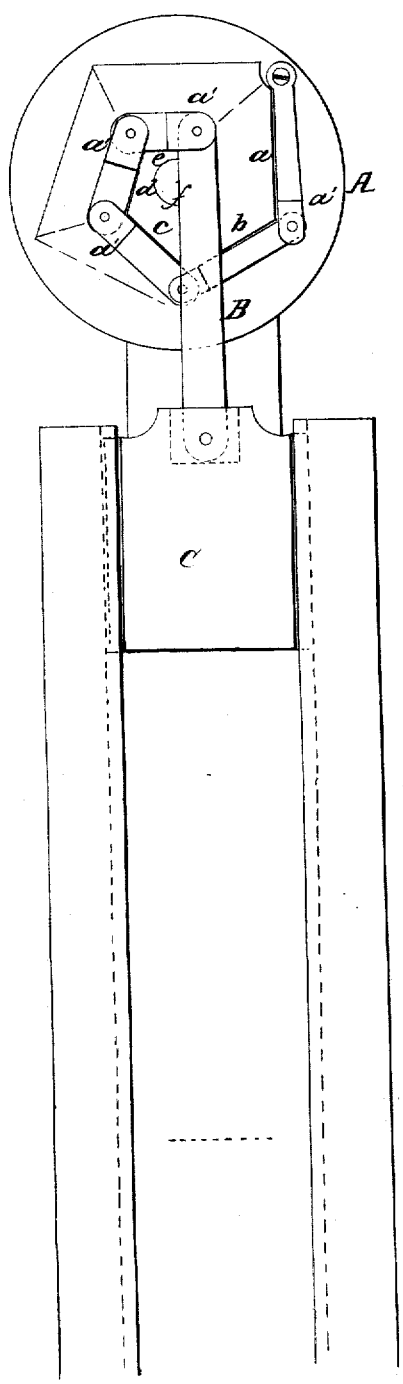
Figure 2:
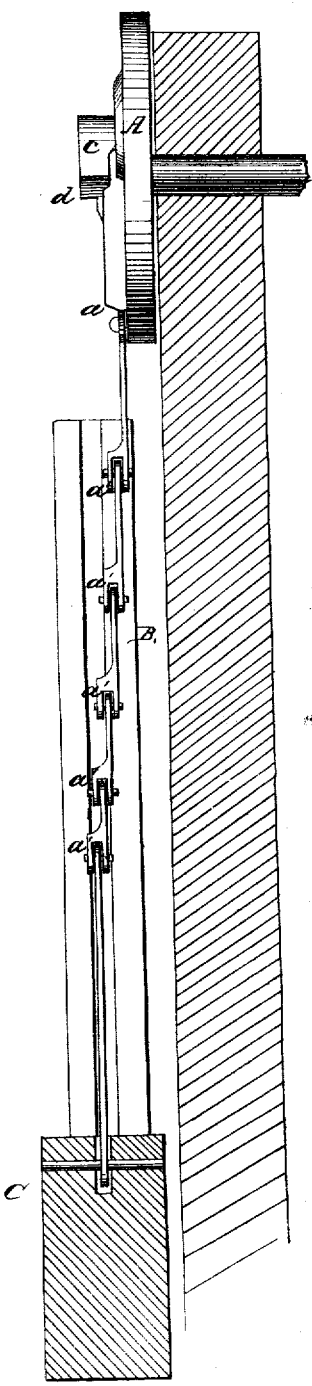

Figure 1, is a front or face view of my improvement. Fig. 2, is a side view of ditto.

Similar letters of reference indicate corresponding parts in the two figures.

The nature of my invention consists in the so making of a chain, to be used on power presses, as that the line of the links shall recede from a straight line, and at the same time the links diminish in length from their point of attachment to the wheel on which they are to be wound, to the follower, which they are intended to raise, for purposes that will be now described.

To enable others skilled in the art to fully understand and construct my invention, I will proceed to describe it.

A, represents a pulley and, B, is a chain attached to one side of the pulley near its periphery. The side of the pulley to which the chain is attached has projecting surfaces (*a*), (*b*), (*c*), (*d*) (*e*) (*f*), upon it, the projecting surfaces gradually decreasing in length from the inner to the outer one. These projecting surfaces resemble in effect a cone pulley as the surfaces above named gradually extend outward from the side of the pulley and decrease in size as they extend outward.

The links of the chain are made of a length to correspond to the length of the projecting surfaces, each link of the chain when the pulley A, is turned resting upon its proper projection. The number of links therefore should correspond to the number of projections, and the length of the links must diminish in the exact ratio of the distance of one bearing or projection from the other, on the face of the wheel. Thus the face of the chain recedes gradually from the wheel to the follower and at the same time the links diminish in length, as they extend from the wheel to the follower.

The links of the chain have a lip (*a'*) on their lower ends which are so connected with the links as to branch laterally outward, and form sockets for the upper ends of the adjoining links so that the upper end of one link will be by the side of the lower end of its upper adjoining link and will consequently be farther out from the side of the pulley A the distance of the width of the links. The links being thus connected it will be seen that the lower end of the chain will be farther out from the side of the pulley than the upper end, and each link will be directly in line with its projecting surface so that as the pulley A is turned the several links will be wound upon their proper surfaces without at all interfering with each other, and the follower, C, to which the lower end of the chain is connected will have a direct "pull," upon it during the whole length of its stroke.

The above invention is an improvement on the ordinary cone pulley and chain or rope used. Where a progressive power is required with the cone pulley and rope or chain the "pull," is in an oblique direction, because the rope or chain is continually changing its position upon the cone while the follower is moved in a direct line and consequently undue friction is created in the follower guides. This difficulty is obviated by my improvement, which is intended chiefly for cotton and other presses.

Having thus described my invention what I claim as new and desire to secure by Letters Patent is—

The so making of a chain for power presses as that it shall recede gradually from a straight line, and the links diminish in length as they extend from the wheel on which they are to be wound to the follower which said chain is designed to work, substantially as herein described.

NATHAN CHAPMAN.

Witnesses:
SIMION G. FISH,
E. P. RANDALL.